(12) United States Patent  
Ranganathan

(10) Patent No.: US 8,559,717 B2  
(45) Date of Patent: Oct. 15, 2013

(54) DETECTING AND LABELING PLACES USING RUNTIME CHANGE-POINT DETECTION AND PLACE LABELING CLASSIFIERS

(75) Inventor: Ananth Ranganathan, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 317 days.

(21) Appl. No.: 13/048,617

(22) Filed: Mar. 15, 2011

(65) Prior Publication Data

US 2011/0229031 A1 Sep. 22, 2011

Related U.S. Application Data

(60) Provisional application No. 61/314,461, filed on Mar. 16, 2010.

(51) Int. Cl.
*G06K 9/00* (2006.01)

(52) U.S. Cl.
USPC ........... 382/170; 382/171; 382/190; 382/225; 382/275; 348/335

(58) Field of Classification Search
USPC ........... 382/170, 171, 190, 225, 275; 348/335
See application file for complete search history.

(56) References Cited

U.S. PATENT DOCUMENTS

| | | | | |
|---|---|---|---|---|
| 5,299,284 A | * | 3/1994 | Roy | 706/20 |
| 5,546,475 A | * | 8/1996 | Bolle et al. | 382/190 |
| 6,393,423 B1 | * | 5/2002 | Goedken | 1/1 |
| 6,404,925 B1 | * | 6/2002 | Foote et al. | 382/224 |
| 6,807,312 B2 | * | 10/2004 | Thomas et al. | 382/253 |
| 7,555,165 B2 | | 6/2009 | Luo et al. | |
| 2007/0041638 A1 | * | 2/2007 | Liu et al. | 382/170 |
| 2009/0060340 A1 | | 3/2009 | Zhou | |
| 2009/0290802 A1 | | 11/2009 | Hua et al. | |

FOREIGN PATENT DOCUMENTS

JP 2003157439 5/2003

OTHER PUBLICATIONS

Torralba, A. et al., "Context-Based Vision System for Place and Object Recognition," Mar. 2003, AI Memo May 2003; Massachusetts Institute of Technology—Artificial Intelligence Laboratory, eleven pages.

* cited by examiner

*Primary Examiner* — David Zarka
*Assistant Examiner* — Eueng-Nan Yeh
(74) *Attorney, Agent, or Firm* — Fenwick & West LLP; Mark E. Duell

(57) ABSTRACT

A system and method are disclosed for detecting and labeling places in a video stream using change-points detection. The system comprises a place label generation module configured to assign place labels probabilistically to places in the video stream based on the measurements of the measurement stream representing the video. For each measurement in the segment, the place label generation module classifies the measurement by computing the probability of the measurement being classified by a learned Gaussian Process classifier. Based on the probabilities generated with respect to all the measurements in the segment, the place label generation module determines the place label for the segment. In cases where a Gaussian Process classifier cannot positively classify a segment, the place label generation module determines whether the segment corresponds to an unknown place based on the perplexity statistics of the classification and a threshold value.

32 Claims, 11 Drawing Sheets

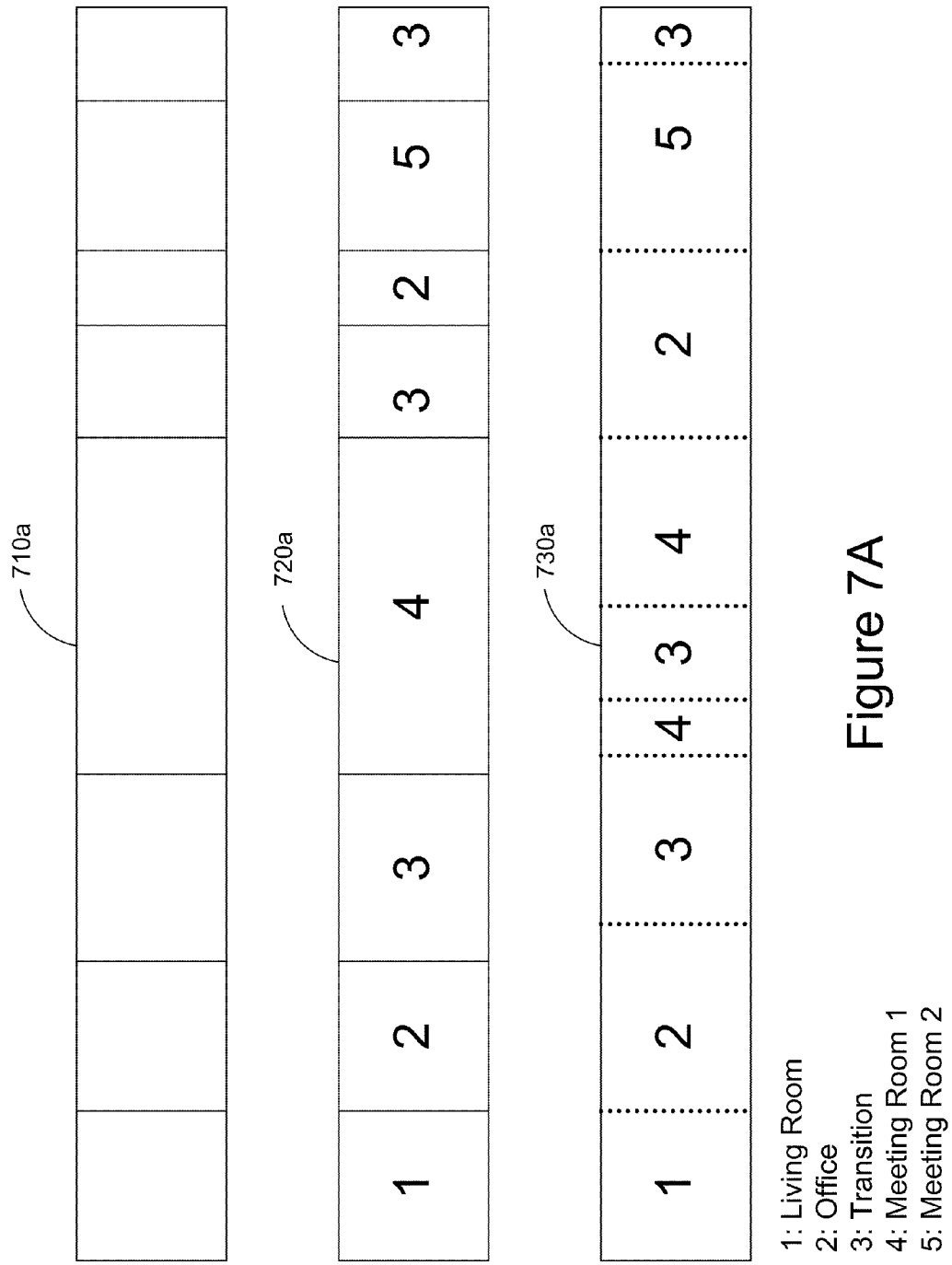

DETECTING AND LABELING PLACES USING RUNTIME CHANGE-POINT DETECTION AND PLACE LABELING CLASSIFIERS

CROSS REFERENCE TO RELATED APPLICATIONS

This application claims the benefit of U.S. Provisional Application No. 61/314,461, filed Mar. 16, 2010, entitled "PLISS: Detecting and Labeling Places Using Online Change-Point Detection," which is incorporated by reference in its entirety. This application is also related to U.S. application Ser. No. 13/044,287, filed Mar. 9, 2011, entitled "Detecting and Labeling Places Using Runtime Change-Point Detection," which is incorporated by reference in its entirety.

FIELD OF THE INVENTION

The invention relates generally to place classification in image processing systems, and in particular to labeling places using runtime Gaussian change-point detection and Gaussian Process classifiers.

BACKGROUND OF THE INVENTION

In computer image analysis such as intelligent transportation systems, a common task is to consistently classify and label places in a captured image scene. For example, place recognition is the task of consistently labeling a particular place (e.g., "kitchen on 2nd floor with a coffee machine") every time the place is visited, while place categorization is to consistently label places according to their category (e.g., "kitchen", "living room"). Place recognition and categorization are important for a robot or an intelligent agent to recognize places in a manner similar to that done by humans.

Most existing place recognition systems assume a finite set of place labels, which are learned offline from supervised training data. Some existing place recognition systems use place classifiers, which categorize places during runtime based on some measurements of input data. For example, one type of place recognition method models local features and distinctive parts of input images. Alternatively, a place recognition method extracts global representations of input images and learns place categories from the global representations of the images.

Existing place recognition systems face a variety of challenges including the requirement of large training data and limited place recognition (e.g., only recognizing places known from training data). For example, existing place recognition methods in robotics range from matching scale-invariant feature transform (SIFT) features across images to other derived measures of distinctiveness for places such as Fourier signatures, subspace representations and color histograms. These methods have the disadvantage of not being able to generalize and also are invariant to perspective mainly through the use of omnidirectional images.

BRIEF DESCRIPTION OF THE DRAWINGS

FIG. 7A is a block diagram of an example experimental result of labeling places using change-point detection according to one embodiment of the invention.

DETAILED DESCRIPTION OF THE INVENTION

Figure 1A:
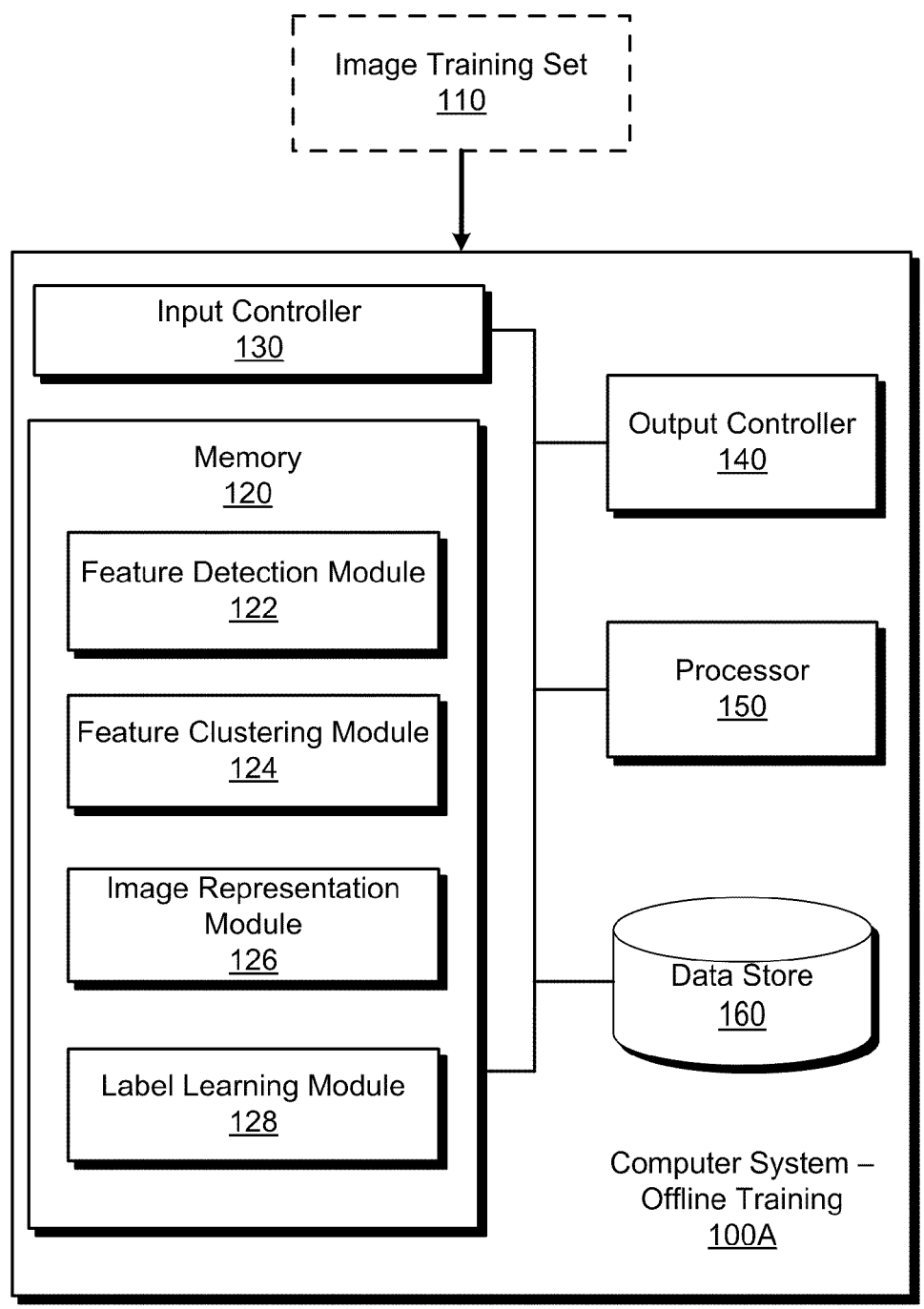
FIG. 1A illustrates a computer system for learning place models during offline training according to one embodiment of the invention.

An embodiment of the invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the invention include process steps and instructions described herein in the form of an algorithm. It should be noted that the process steps and instructions of the invention could be embodied in software, firmware or hardware, and when embodied in software, could be downloaded to reside on and be operated from different platforms used by a variety of operating systems.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the invention is not described with reference to any particular programming language. It will be appreciated that a variety of programming languages may be used to implement the teachings of the invention as described herein, and any references below to specific languages are provided for disclosure of enablement and best mode of the invention.

In addition, the language used in the specification has been principally selected for readability and instructional purposes, and may not have been selected to delineate or circumscribe the inventive subject matter. Accordingly, the disclosure of the invention is intended to be illustrative, but not limiting, of the scope of the invention, which is set forth in the claims.

Embodiments of the invention provide a place recognition method/system for labeling places of a video/image sequence using runtime change-point detection. A video/image sequence is represented by a measurement stream comprising multiple image histograms of feature frequencies associated with the video/image sequence. The measurement stream is segmented into segments corresponding to places recognized in the video/image sequence based on change-point detection. Change-point detection is to detect abrupt changes to the parameters of a statistical place model. By detecting the changes in the parameters of the statistical place model modeling a video/image sequence, the place boundaries in the video/image sequence are obtained, where a place is exited or entered at each place boundary.

One embodiment of a disclosed system includes a segmentation module for providing place boundaries in a video/image stream. The segmentation module is configured to compute the probability of a change-point occurring at each time-step of the segments of a measurement stream representing a video/image stream. The segmentation module tracks the probabilities of detected change-points in the measurement stream. The probability of a change-point at any given time-step is obtained by combining a prior on the occurrences of change-points with the likelihood of the current measurement of the measurement stream given all the possible scenarios in which change-points could have occurred in the past.

One embodiment of a disclosed system also includes a place label generation module for labeling places known or unknown to pre-learned place classifiers (e.g., Gaussian Process classifiers). The place label generation module is configured to assign place labels probabilistically to places in a video/image sequence based on the measurements of the measurement stream representing the video/image sequence, the most recently assigned place label and change-point distribution. For each measurement in the segment, the place label generation module classifies the measurement by computing the probability of the measurement being classified by a learned Gaussian Process classifier. Based on the probabilities generated with respect to all the measurements in the segment, the place label generation module determines the place label for the segment. In cases where a Gaussian Process classifier cannot positively classify a segment, the place label generation module computes perplexity statistics of the classification and a threshold value. Based on the perplexity statistics of the classification and the threshold value, the place label generation module determines whether the segment corresponds to an unknown place.

System Overview

The place recognition problem described above can be formulated as follows. Given a measurement stream representing a video/image sequence, measurements at some (possibly changing) intervals are generated. For simplicity, the intervals are referred to as "time-steps." In one embodiment, an image from a video/image sequence is represented by one or more image histograms of feature frequencies associated with the image. Each image of the video/image sequence is represented by a spatial pyramid of multiple image histograms of feature frequencies associated with the image. For simplicity, histograms of feature frequencies associated with the image from the video/image sequence are referred to as "image histograms." The image histograms of a video/image sequence form a measurement stream of the video/image sequence, where the each image histogram is a measurement of the measurement stream.

It is noted that a place label remains the same for periods of time when a robot is moving inside a particular place. The place label only changes sporadically when the robot travels into the next place. Thus, a measurement stream representing a video sequence at runtime can be segmented into segments corresponding to places captured in the video sequence, where measurements in each segment are assumed to be classified by a corresponding place classifier. The start and end of a segment classified by the corresponding classifier are referred to as "change-points." The change-points of a segment provide a reliable indication regarding the place label of the segment.

For each measurement, a label corresponding to the type of the place (e.g., kitchen, living room, office) is generated. If a measurement does not correspond to any type of the place, the measurement is likely to represent an unknown place. The place types can be represented by place models. In one embodiment, the place models representing the place types are given in the form of N Gaussian Process classifiers $C_1$, $C_2, \ldots C_N$. A Gaussian Process (GP) is a distribution over a space of functions such that the joint distribution over any collection of data pointes is a Gaussian. Gaussian Processes can be viewed as probabilistic kernel machines, and hence, can provide not only a mean value prediction but also the uncertainty measured in terms of standard deviation for a test sample. A large standard deviation indicates the absence of any training data in the neighborhood of the test sample, and provides an indication of poor generalization.

In one embodiment, the Gaussian Process classifiers $C_1$, $C_2, \ldots C_N$ are learned offline from pre-labeled training data. An example computer system for learning the GP classifiers offline from pre-labeled training data is further described below with reference to FIG. 1A. An example computer system for detecting and labeling places using Gaussian change-point detection at runtime is further described below with reference to FIG. 1B.

Figure 2:
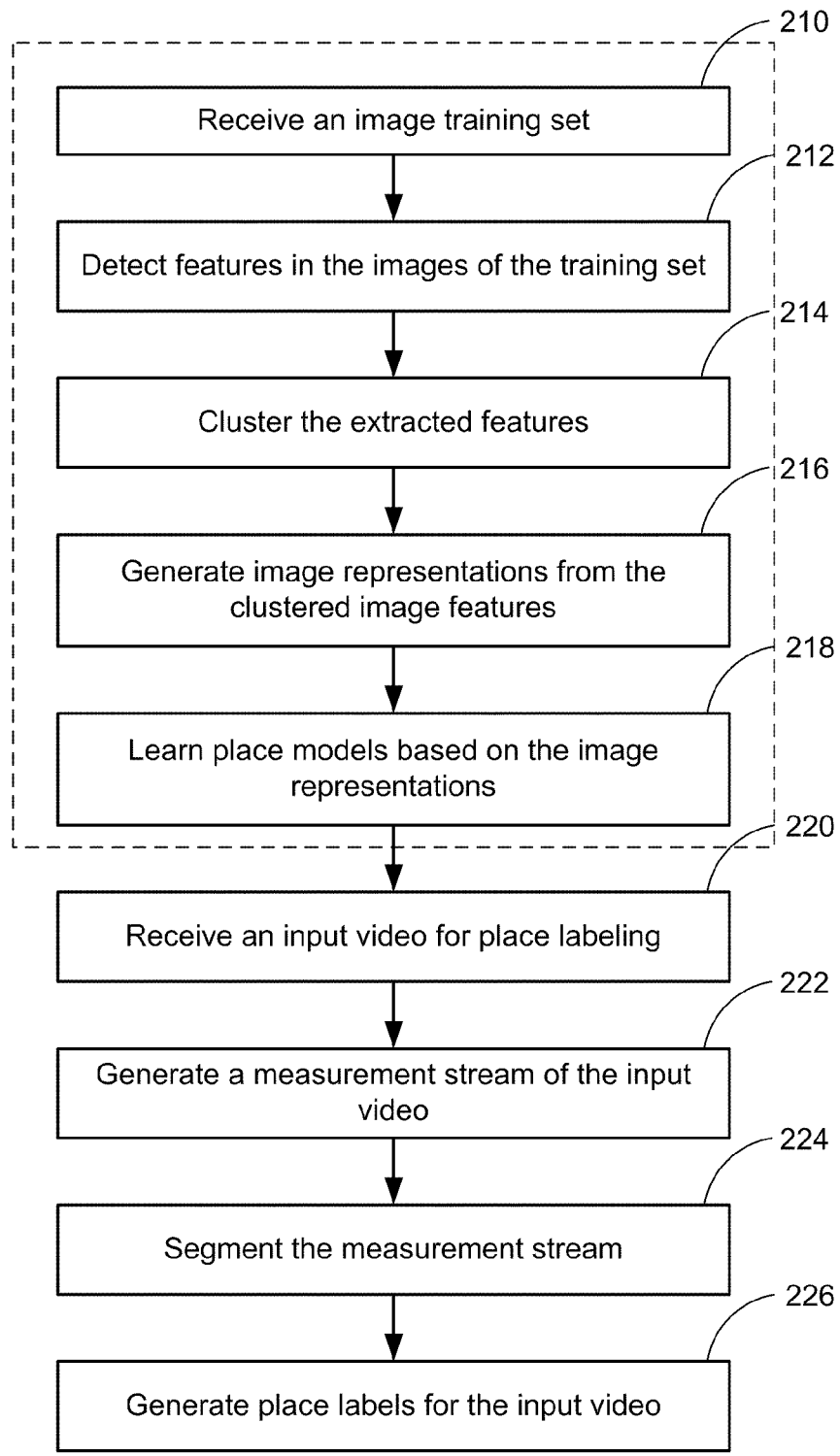
FIG. 2 is a system level flowchart of learning place models and labeling places using change-point detection according to one embodiment of the invention.

FIG. 2 is a system level flowchart of detecting and labeling places using change-point detection according to one embodiment of the invention. A place recognition system for place labeling first learns the GP classifiers offline from an image training set and applies the learned GP classifiers to an input video at runtime to generate place labels for the input video. Initially, the place recognition system receives 210 an image training set and detects 212 features (e.g., image features and/or texture features) in the images of the training set. The place recognition system extracts and clusters 214 the features into one or more sets of feature vectors. From the clustered features, the place recognition system generates 216 image representations (e.g., spatial pyramid of image histograms) and learns 218 the place models (i.e., GP classifiers) based on the image representations.

At run time, the place recognition system receives 220 an input video for place labeling. The place recognition system generates image representations (e.g., spatial pyramids of image histograms) of images of the input video. The spatial pyramids of image histograms of images at different spatial resolutions are combined to generate 222 a corresponding measurement stream of the input video. The place recognition system segments 224 the measurement stream into multiple segments. Using the learned GP classifiers, the place recognition system generates 226 place labels for the input video.

Image Representation by Image Histograms

Turning now to FIG. 1A, FIG. 1A illustrates a computer system 100 for learning place models offline from pre-labeled training data according to one embodiment of the invention. The computer system 100A comprises a memory 120, an input controller 130, an output controller 140, a processor 150 and a data store 160. In one embodiment, the computer system 100A is configured to receive an image training set 110 for learning place models (e.g., GP classifiers) from the image training set 110.

The image training set 110 comprises multiple pre-labeled images. In one embodiment, the image training set 110A comprises video sequences obtained from Visual Place Categorization (VPC) dataset. The dataset contains image sequences from six different homes, each containing multiple floors. The data set from each home consists of between 6000 and 10000 frames. In one embodiment, image sequences from each floor are treated as a different image sequence. The dataset has been manually labeled into 5 categories (e.g., living room, office) to provide ground truth for the place categorization problem to be solved by the disclosed method/system. In addition, a "transition" category is used to mark segments that do not correspond determinatively to any place category.

The memory 120 stores data and/or instructions that may be executed by the processor 150. The instructions may comprise code for performing any and/or all of the techniques described herein. Memory 120 may be a DRAM device, a static random access memory (SRAM), Flash RAM (non-volatile storage), combinations of the above, or some other memory device known in the art. In one embodiment, the memory 120 comprises a feature detection module 122, a feature clustering module 124, an image representation module 126 and a label learning module 128. The feature detection module 122 detects and extracts image features and/or textures from the images in the image training set 110. The feature clustering module 124 groups the extracted image/texture features into clusters. The image representation module 126 generates image representations of images of the image training set 110. The label learning module 128 learns multiple place models (e.g., GP classifiers) from the image representations and stores the learned place models in the data store 160.

The feature detection module 122 comprises computer executable instructions for detecting and extracting image/texture features from input images. In one embodiment, the feature detection module 122 detects scale-invariant feature transform (SIFT) features on a dense grid on each of a set of input images. SIFT is a way to detect and describe local features in an image by detecting multiple feature description key points of objects in an image. The feature detection module 122 extracts SIFT features by transforming an input image into a large collection of feature vectors, each of which is invariant to image translation, scaling and rotation and partially invariant to illumination and to local geometric distortion.

In another embodiment, the feature detection module 122 detects CENTRIST features from input images. CENTRIST is based on census transform of an image, which is a local feature computed densely for every pixel of the image, and encodes the value of a pixel's intensity relative to that of its neighbors. The feature detection module 122 computes census transform by considering a patch centered at every pixel of an image. The transform value is a positive integer that takes a range of values depending on the size of the patch. For instance, a patch size of 3, where there are 8 pixels in the patch apart from the central pixel, has transform values between 0 and 255.

In yet another embodiment, the feature detection module 122 detects texture features of the input images. Texture feature of an image is a function of the spatial variation in pixel intensities (e.g., gray values) of the image. The feature detection module 122, in one embodiment, extracts texture features from the input images using 17-dimensional filter bank (e.g., Leung-Malik filter bank).

The feature clustering module 124 comprises computer executable instructions for clustering features extracted by the feature detection module 122. In one embodiment, the feature clustering module 214 clusters the extracted SIFT image features by quantizing the image features using K-means to create a codebook/dictionary of code words of a pre-specified size. A code word of the dictionary is represented by a cluster identification of the quantized image feature. Similar to SIFT image features clustering, the feature clustering module 124 uses K-means to cluster texture features of the input images to create a dictionary comprising the cluster identifications of the quantized texture features.

The image representation module 126 comprises computer executable instructions for representing input images by image histograms. For example, an image of a video sequence is represented by one or more image histograms of feature frequencies associated with the image. The image histograms of a video sequence forms a measurement stream for segmentation and place label generation at runtime. The image histograms are the measurements in the change-point detection procedure described below.

In one embodiment, the image representation module 126 uses a spatial pyramid of image histograms to represent an image of a video sequence at different spatial resolutions. Specifically, the image representation module 126 obtains a spatial pyramid of an image by computing histograms of feature frequencies at various spatial resolutions across the image. The histogram bins contain the number of quantized image features in each of the image feature clusters in the image region being processed. The image representation module 126 divides the image into successive resolutions. In one embodiment, the image representation module 126 only computes the image histograms at the finest resolution since the coarser resolution image histograms can be obtained by adding the appropriate image histograms at an immediately finer level. All the image histograms from the different resolutions are then concatenated to produce the spatial pyramid representation of the image.

To compute the spatial pyramid of image histograms of an image, the image representation module 126 needs two parameters: the number of levels in the spatial pyramid and the number of feature clusters. Taking a spatial pyramid based on SIFT features of an image as an example, the image presentation module 126 computes the spatial pyramid of the image using the number of levels in the pyramid corresponding to the number of spatial resolutions of the image and the number of the image clusters computed in SIFT space (i.e., the size of the codebook). SIFT features have local information about an image patch while an image histogram has global information. By combining both of SIFT features and image histogram at different scales, the spatial pyramid of image histograms obtains more fine-grained discriminative power of the image.

In addition to SIFT features, the image representation module 126 can compute spatial pyramids using two other features, CENTRIST and texture. For example, the image representation module 126 computes a census transform histogram of an image based on the CENTRIST features extracted from the image. One advantage of using CENTRIST features to compute the image histograms is the image representation module 126 can directly compute the census transform histograms from the CENTRIST features without clustering the features, thus with reduced computation load. In another embodiment, the image representation module 126 computes a texture-based spatial pyramid of an image using texture features of the image.

Figure 4A:
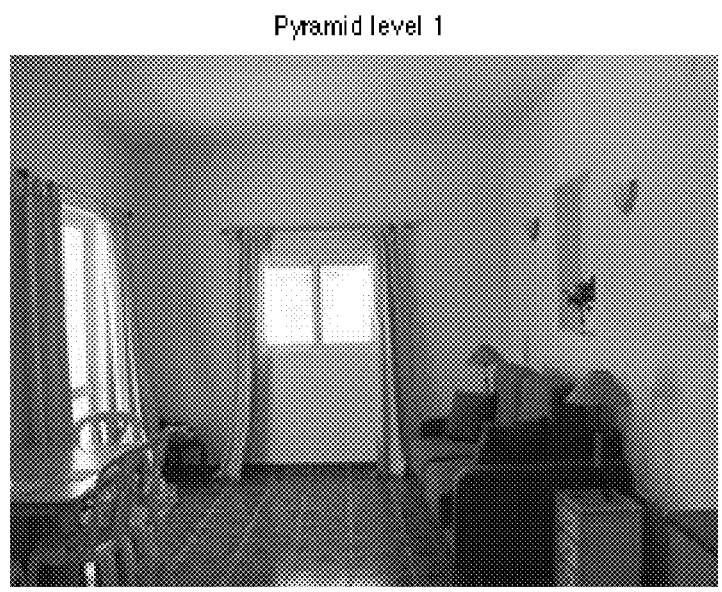
FIG. 4A is an example image at a first spatial resolution to be represented by an image histogram.
Figure 4B:
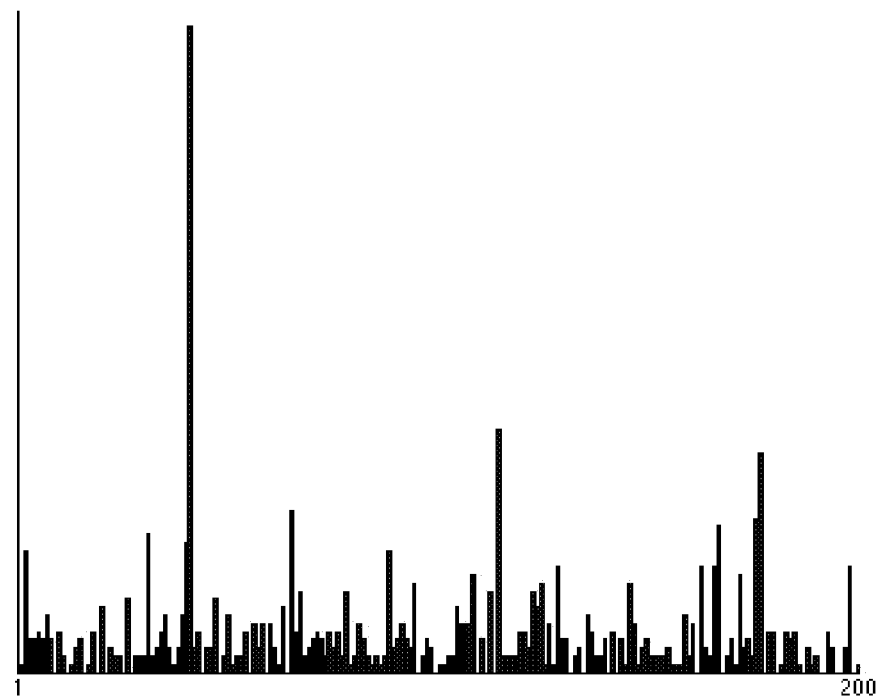
FIG. 4B is a corresponding image histogram of the image illustrated in FIG. 4A according to one embodiment of the invention.

Turning to FIG. 4, FIG. 4A is an example image at its original spatial resolution (e.g., pyramid level 1). FIG. 4B is a corresponding image histogram of the clustered SIFT features extracted from the input image illustrated in FIG. 4A according to one embodiment of the invention. The histogram illustrated in FIG. 4B shows multiple histogram bins, each of which corresponds to the number of features in each of the feature clusters in the image.

Figure 4C:
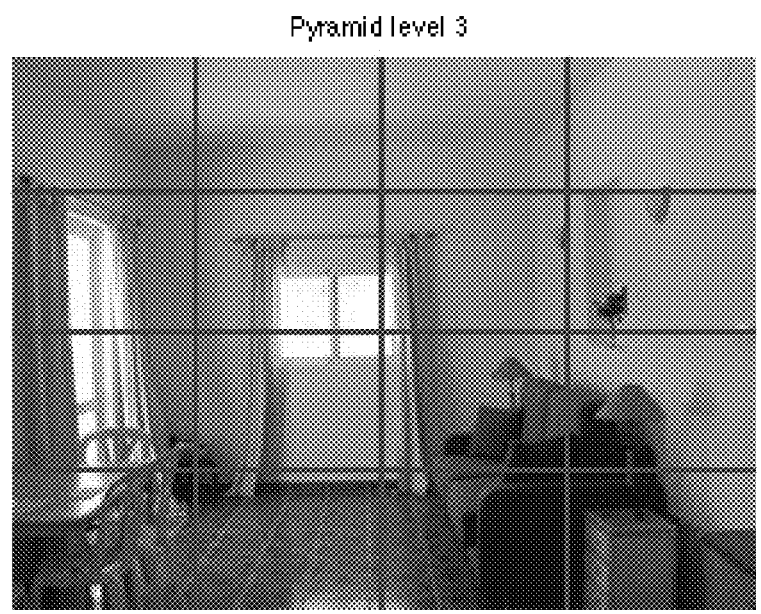
FIG. 4C is an example image at a second spatial resolution to be represented by multiple image histograms.
Figure 4D:
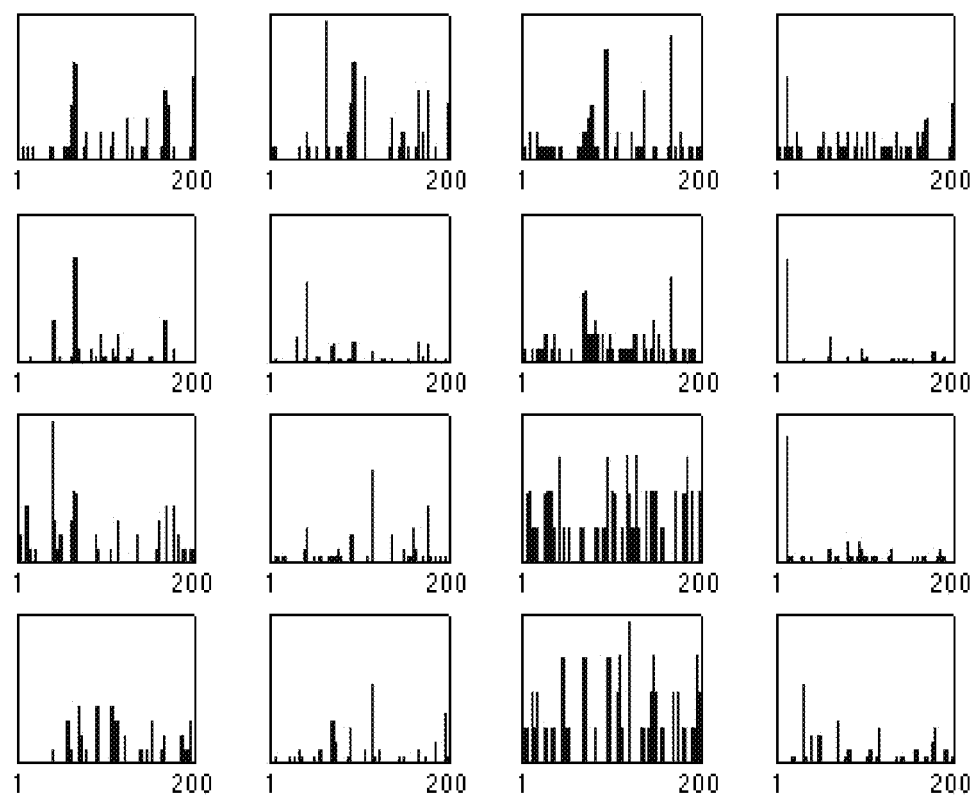
FIG. 4D is a corresponding image histograms of the image illustrated in FIG. 4C according to one embodiment of the invention.

FIG. 4C is an example of the input image illustrated in FIG. 4A at a finer spatial resolution (e.g., pyramid level 3). The input image at pyramid level 1 (e.g., its original spatial resolution) is subdivided into 16 successive resolutions (i.e., the grid illustrated in FIG. 4C), each of which is a sub-image region of the input image. For each of the 16 successive resolutions, the image representation module 126 generates a corresponding spatial histogram based on the clustered SIFT features extracted from the sub-image region. FIG. 4D illustrates the 16 spatial histograms corresponding to the 16 sub-image regions illustrated in FIG. 4C.

The label learning module 128 comprises computer executable instructions for learning place models (e.g., GP classifiers) from the image training set 110. In one embodiment, the label learning module 128 interacts with the image representation module 126 to obtain image histograms generated from the image training set 110, and from the image histograms, the label learning module 128 learns one or more place models. The place labels learned by the label learning module 128 are represented in a form of N Gaussian Process classifiers $C_1, C_2, \ldots C_N$, where each learned Gaussian Process classifier classifies one type of places (e.g., kitchen). The learned Gaussian Process classifiers are stored in the data store 160 and are used at runtime to label places captured in a video sequence. The label learning module 128 is further described below with reference to section of "fast Gaussian change-point detection" and FIG. 6 below.

Figure 1B:
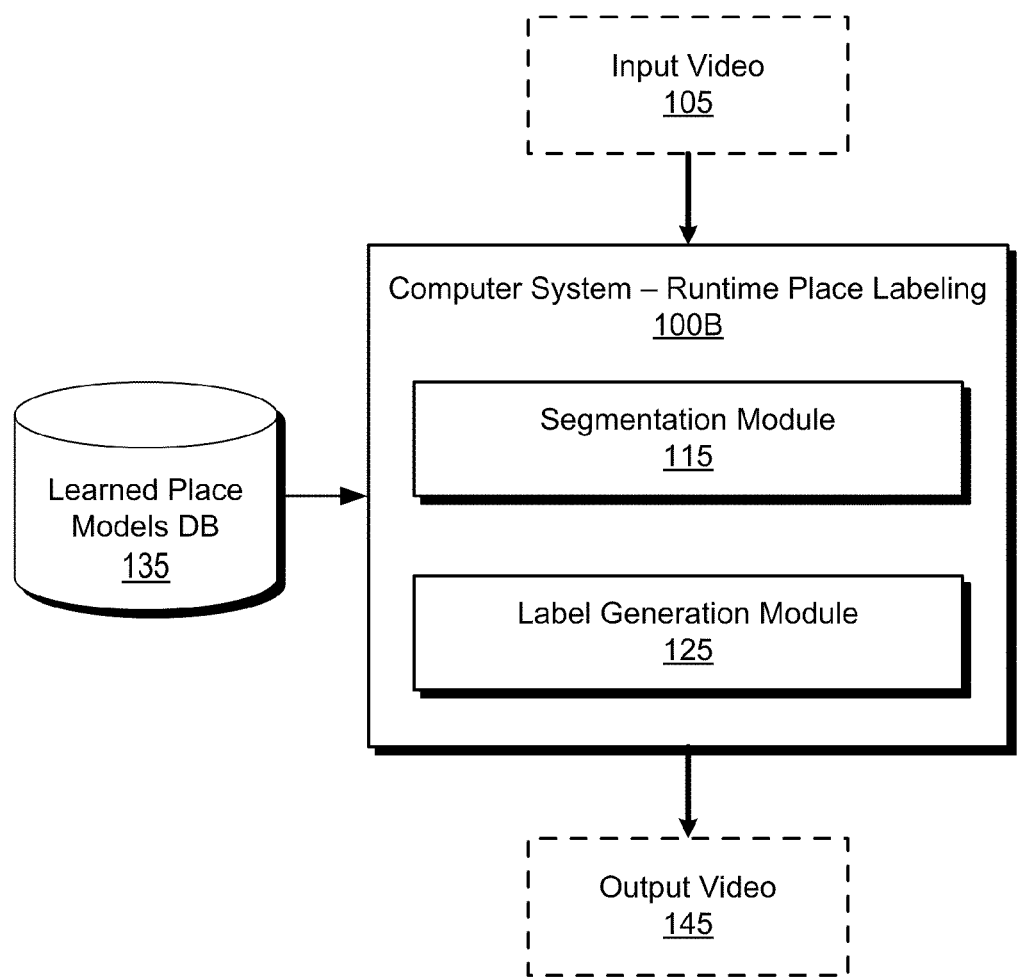
FIG. 1B illustrates a computer system for detecting and labeling places using change-point detection at runtime according to one embodiment of the invention.

FIG. 1B illustrates a computer system for detecting and labeling places using change-point detection at runtime according to one embodiment of the invention. The computer system 100b comprises a learned place models database 135, a segmentation module 115 and a label generation module 125. In one embodiment, the computer system 100B is configured to receive an input video 105 for place labeling and generates an output video 145 with places in the video labeled. The segmentation module 115 generates a measurement stream representing the input video 105 based on the image histograms of the input video 105. The segmentation module 115 computes probabilities of detected change-points in the measurement stream. The label generation module 125 uses the Gaussian Process classifiers stored in the database 135 and the change-points probabilities to label places captured in the input video 105.

Model-Based Change-Point Detection

The segmentation module 115 is configured to segment a measurement stream representing the input video 105 into non-overlapping and adjacent segments corresponding to places captured in the input video 105. The measurement stream of the input video 105 is generated based on the image histograms of the input video 105, where the image histograms of the input video 105 are the measurements of the measurement stream. The boundaries between the segments are the change-points. In one embodiment, the segmentation module 115 uses a Bayesian change-point detection method to compute the probability of a change-point occurring at each time-step. The probability of a change-point at any given time-step is obtained by combining a prior on the occurrence of change-points with the likelihood of the current measurement given all the possible scenarios in which change-points could have occurred in the past.

In one embodiment, the segmentation module 115 generates the image histograms of the input video 105 similar to the image representation module 126 illustrated in FIG. 1A except without clustering features of the input video 105. Specifically, the segmentation module 115 uses the extracted features (e.g., image features and/or texture features) of the input video 105 and generates image histograms based on the extracted features at each spatial resolution of the images of the input video 105. Given that the cluster identification for each identified feature of the input video 105 has already been learned offline from the image training set, the segmentation module 115 uses the features extracted from the input video 105 without clustering the features before generating the image histograms.

Assuming that a sequence of input data (e.g., the measurement stream of the input video 105) $y_1, y_2, \ldots y_t$ can be segmented into non-overlapping and adjacent segments. The boundaries between the segments are the change-points. In one embodiment, the change-points are model based, where the form of the probability distribution in each segment remains the same and only the parameter value of the model for the segment changes. Further assuming that the probability distribution data are independent identically distributed (i.i.d) within each segment, $c_t$ denotes the length of the segment at time t. $c_t$ also indicates the time since the last change-point. If the current time-step is a change-point, $c_t=0$, indicating that a new place model is used for the segment. If no change-points have occurred, $c_t=t$.

Figure 5A:
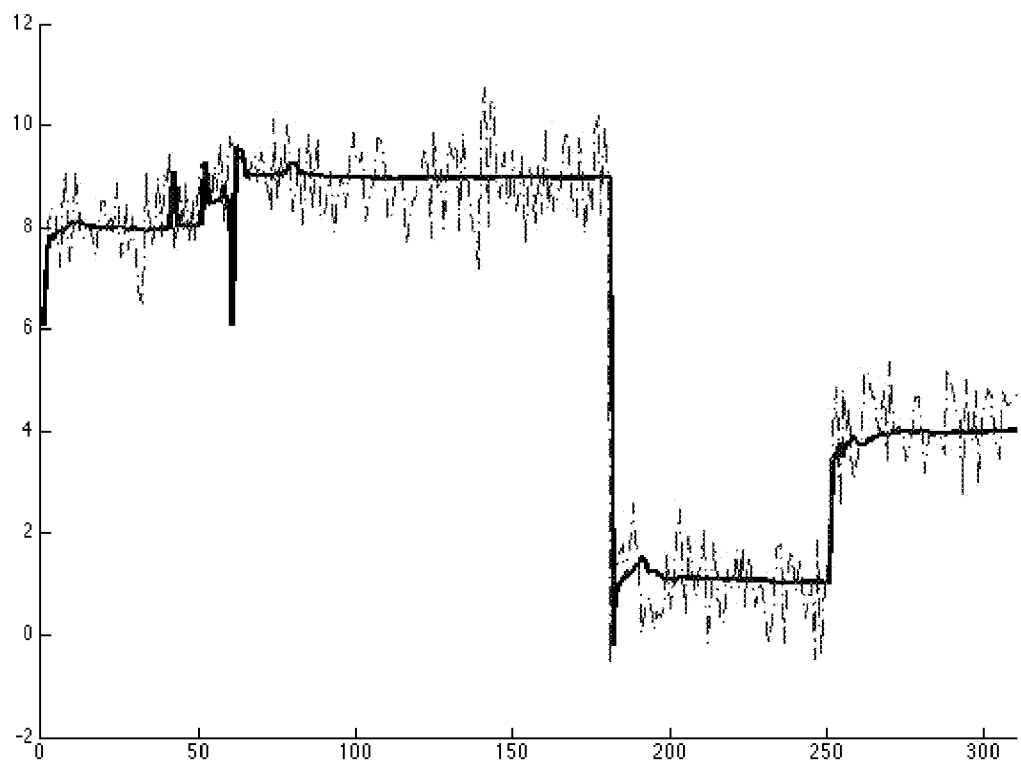
FIG. 5A is an example of univariate Gaussian input data for the model-based change-point detection.
Figure 5B:
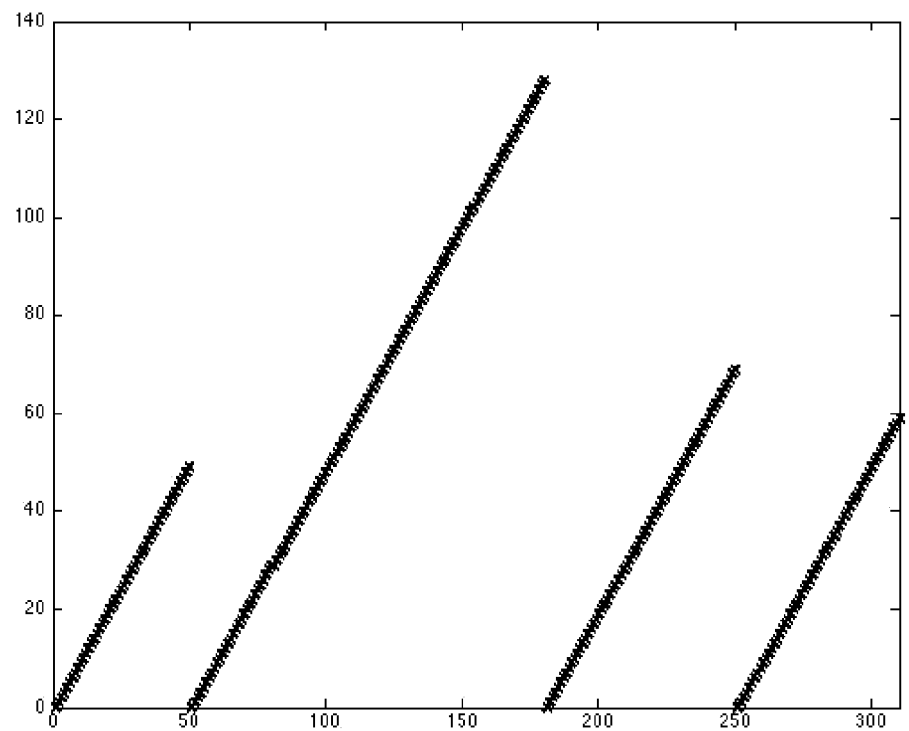
FIG. 5B is a corresponding ground truth for the change-points detected in the input data illustrated in FIG. 5A.
Figure 5C:
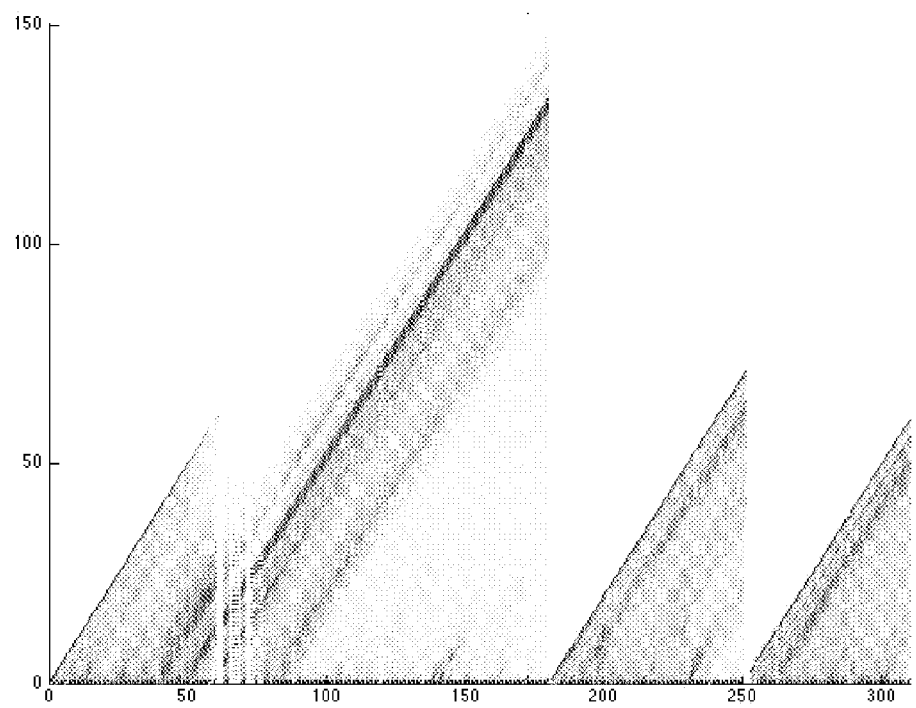
FIG. 5C illustrates the corresponding probability distribution of the detected change-points shown in FIG. 5B.

FIG. 5A is an example of univariate Gaussian input data for the model-based change-point detection, where the input data is represented by the dashed dots. FIG. 5B is a corresponding ground truth for the change-points detected in the input data illustrated in FIG. 5A. The horizontal axis illustrates the time units, each of which represents a detected change-point and two neighboring time units define a segment. The vertical axis shows segment length for each time unit. The ground truth for the change-points detected in the input data is represented by the length of segments. FIG. 5C illustrates the corresponding probability distribution of the detected change-points shown in FIG. 5B.

Denoting the place label at time t as $x_t^c$, the place label $x_t^c$ is indexed by the current segment since the whole segment has a single place label. The place label $x_t^c$ is also updated with each measurement at time t. The probability distribution over $x_t^c$ is taken to be a discrete distribution of size N, one for each of the learned GP classifiers.

To obtain the place label $x_t^c$ at time t, a joint posterior on $c_t$ and $x_t^c$ given the probability distribution data, $p(c_t, x_t^c|y_{1:t})$, is computed, where $y_{1:t}$ denotes all the input data from time 1 to time t. The posterior can be factored as Equation 1 below:

$$p(c_t, x_t^c | y_{1:t}) = p(c_t|y_{1:t}) p(x_t^c|c_t, y_{1:t}) \quad (1)$$

The first term of Equation (1), $p(c_t|y_{1:t})$, is the posterior over the segment length. Computation of $p(c_t|y_{1:t})$ over the input data from time 1 to time t provides the change-point detection of the input data.

The likelihood of the input data in segment $c_t$ is represented as $p(y_t|\xi_t^c)$, where $\xi_t^c$ is a parameter set. The data inside each segment are assumed to be independent identically distributed (i.i.d) and the parameters are assumed i.i.d according to a prior parameter distribution. The change-point posterior from Equation (1) can be expanded using Bayes law as Equation (2) below:

$$p(c_t|y_{1:t}) \propto p(y_t|c_t, y_{1:t-1}) p(c_t|y_{1:t-1}). \quad (2)$$

The first term of Equation (1) is the data likelihood, and the second term of Equation (2) can be further expanded by marginalizing over the segment length at the previous time step to yield a recursive formulation for $c_t$ as Equation (3) below:

$$p(c_t | y_{1:t-1}) = \sum_{c_{t-1}} p(c_t | c_{t-1}) p(c_{t-1} | y_{1:t-1}) \quad (3)$$

where $p(c_t|c_{t-1})$ is the transition probability, $p(c_{t-1}|y_{1:t-1})$ is the posterior from the previous step, and $c_1, c_2, \ldots c_t$ form a Markov chain.

For characterizing the transition probability $p(c_t|c_{t-1})$ in Equation (3), it is noted that the only two possible outcomes are $c_t=c_{t-1}+1$ when there is no change-point at time t, and $c_t=0$ otherwise. Hence, this is a prior probability on the "lifetime" of this particular segment where the segment ends if a change-point occurs. Using survival analysis, the prior probability predicting the likelihood of occurrence of a change point in a segment can be modeled using a hazard function, which represents the probability of failure in a unit time interval conditional on the fact that failure has not already occurred. If $H(\cdot)$ is a hazard function, the transition probability can be modeled as below in Equation (4):

$$p(c_t | c_{t-1}) = \begin{cases} H(c_{t-1}+1) & \text{if } c_t = 0 \\ 1 - H(c_{t-1}+1) & \text{if } c_t = c_{t-1}+1 \end{cases} \quad (4)$$

In the special case where the length of a segment is modeled using an exponential distribution with time scale $\lambda$ the probability of a change-point at every time-step is constant so that $H(t)=1/\lambda$, and the transition probability is described by Equation (5) below:

$$p(c_t | c_{t-1}) = \begin{cases} \dfrac{1}{\lambda} & \text{if } c_t = 0 \\ 1 - \dfrac{1}{\lambda} & \text{if } c_t = c_{t-1}+1 \end{cases} \quad (5)$$

The justification for using a uniform prior on change-points is that apriori there are no expectations regarding the time spent by a robot in a specific place. If the robot simply peeks into a place and moves away, it gives a very short interval between change-points. On the other hand, it is possible that the robot stays in one place for a very long interval. By keeping a constant change-point probability at each time-step and letting the measurements decide the actual change-point occurrence, it avoids the risk of missing detecting a change-point occurring at a particular time-step.

The data likelihood from Equation (2) can be calculated if the distribution parameter to use is known. Hence, the data likelihood can be integrated over the parameter value using the parameter prior as Equation (5) below:

$$p(y_t|c_t, y_{1:t-1}) = \int_{\xi^c} p(y_t|\xi^c) p(\xi^c|c_t, y_{t-1}^c) \quad (6)$$

where $\xi^c$ is the model parameter for segment $c_t$, and $y_{t-1}^c$ is the data from the current segment. The above integral can be computed in a closed form if the two distributions inside the integral are in the conjugate-exponential family of distributions.

In one embodiment, the conjugate distribution is used and the integrated function is denoted as $p(y_t|c_t, \eta_t^c)$ where $\eta_t^c$ parametrizes the integrated data likelihood. Even though the integrated function $p(y_t|c_t, \eta_t^c)$ usually not in the exponential family, it can be directly updated using the statistics of the data corresponding to the current segment $\{y_{t-1}^c, y_t\}$. In other words, the integration need not be performed at every step for computing efficiency. In the case where t is a change-point (i.e., $c_t=0$), the integrated function $p(y_t|c_t, \eta_t^c)$ is computed with prior values for $\eta_t^{(0)}$.

As described above, the locations of change-points are obtained by maintaining the posterior over segment lengths $c_t$ for all t. The posterior can be approximated using N weighted particles to obtain a constant runtime computation. Specifically, the segment length posterior can be obtained by combining Equations (2), (3), and (4) as the following:

$$p(c_t \mid y_{1:t}) \propto \begin{cases} w_t^{(0)} \sum_{c_{t-1}} H(c_{t-1}+1)\rho_{t-1} & \text{if } c_t = 0 \\ w_t^{(c)} \sum_{c_{t-1}} \{1 - H(c_{t-1}+1)\}\rho_{t-1} & \text{if } c_t = c_{t-1}+1 \end{cases} \quad (7)$$

where the particle filter weights are given by Equation (8) below:

$$w_t^{(c)} = p(y_t \mid c_t, y_{t-1}) \quad (8)$$

And for the case where t is a change-point and $y_{t-1}^c$ is the empty set, $w_t^{(0)} = p(y_t \mid c_t, \eta^{(0)})$, with $\eta^{(0)}$ being the prior parameter value of the integrated likelihood described in Equation (6). $\rho_{t-1} = p(c_{t-1} \mid y_{1:t-1})$ is the posterior from the previous time-step.

The posterior computed in Equation (7) can be approximated using particle filtering for computing efficiency. For example, the posterior computed in Equation (7) is used with a Rao-Blackwellized particle filer with $w_t$ as the particle weights. The particle weights are given by Equation (8). Since the likelihood parameters $\xi^c$ in Equation (6) are integrated out, Rao-Blackwellized particle filer has lower variance than a standard particle filter, and makes the convergence of the computation of the posterior more efficient.

Figure 3:
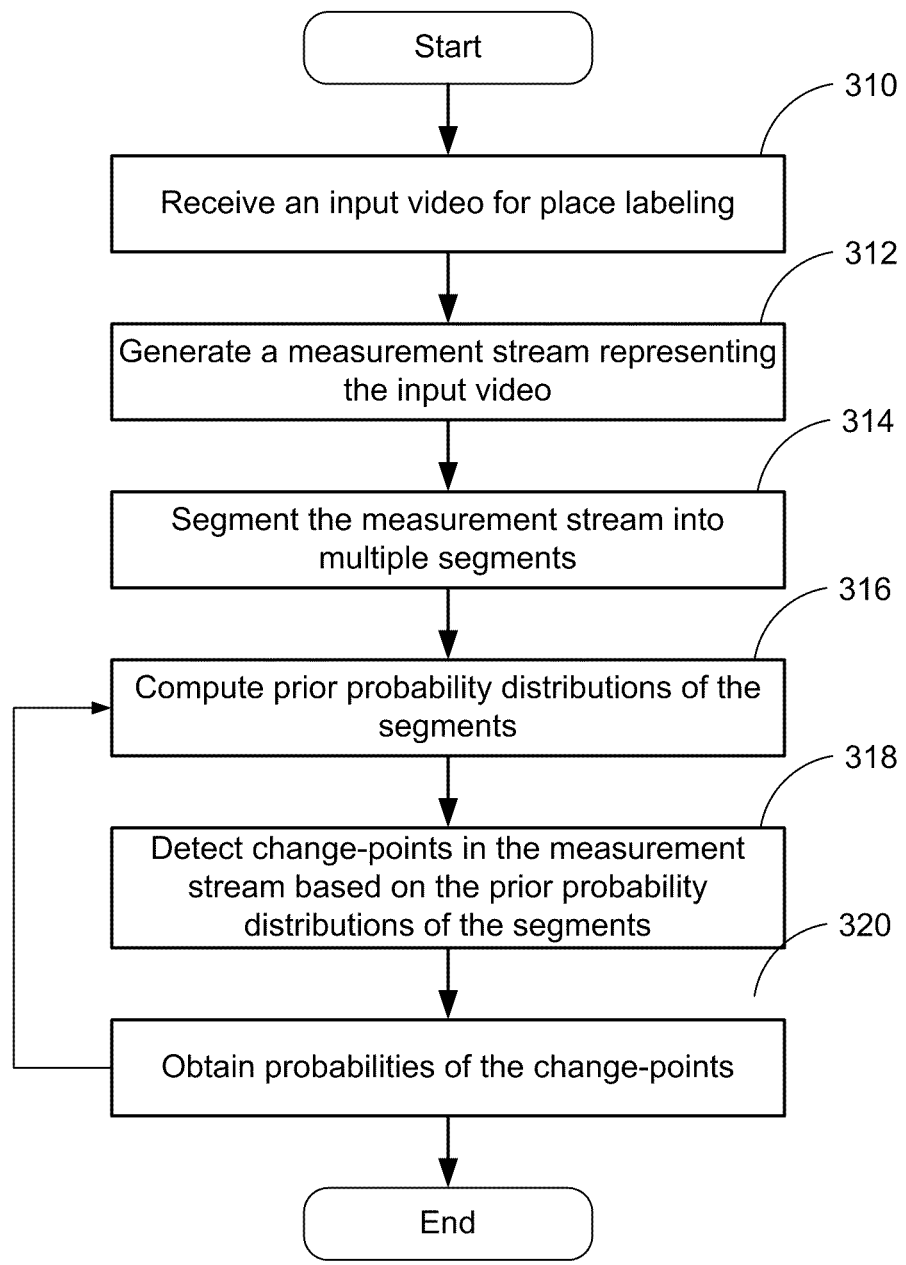
FIG. 3 is a flow chart of video sequence segmentation using change-point detection according to one embodiment of the invention.

FIG. 3 is a flow chart of video sequence segmentation for computing probabilities of detected change-points in an input video according to one embodiment of the invention. Initially, the segmentation module 115 receives 310 an input video for place labeling and generates 312 a measurement stream representing the input video. The image histograms of the input video represent the images of the input video at different spatial resolutions. The segmentation module 115 segments the measurement stream into multiple non-overlapping segments. For each segment, the segmentation module 115 computes 316 prior probability distributions of the image histograms and detects 318 change-points in the segment based on the prior probability distributions. From the detected change-points, the segmentation module 115 obtains 320 the probabilities of the change-points.

Fast Gaussian change-Point Detection

Change-point detection can be implemented using Multivariate Polya models. In one embodiment, the efficiency of change-point detection can be achieved by projecting the measurements of image histograms to a low dimensional space and modeling the measurements using a multivariate Gaussian distribution. Recent research shows that any high dimensional data, when projected down to a uni-dimensional space, follow a Gaussian distribution in most cases. This can also observed in practice by noting that many low dimensional data collections follow Gaussian distributions (e.g., heights of men, birth weights of babies etc) while high dimensional distributions are rarely Gaussian. Recent research has also extended the Gaussian distribution result to multi-dimensional spaces of low dimensionality.

One embodiment of projecting the measurement of image histograms into a low dimensional space (e.g., a principal component analysis (PCA) projection subspace) is to normalize the spatial pyramid histograms of an image by the total number of features in the image. A PCA projection subspace is learned offline using some training images which can be the same as the ones used to compute the SIFT clusters described above. In one embodiment, a 5 to 10 dimensional subspace is used for projecting down the measurements of image histograms.

Assuming the projection is to a d-dimensional space, the likelihood described in Equation (6) can be written using a multivariate normal measurement model as the following:

$$P(y \mid \Theta) = \int_{\mu,\Sigma} P(y \mid \mu, \Sigma) P(\mu, \Sigma \mid \Theta) \quad (9)$$

where $\Theta$ are the prior parameters for the multivariate normal distribution, and $\mu$ and $\Sigma$ are the mean and covariance matrix respectively. Conjugate prior distributions are used for the unknown mean and covariance parameters.

Due to the conjugacy, the integration of Equation (6) can be performed analytically to yield the predictive posterior distribution as a multivariate Student-t distribution as the following:

$$p(y_t \mid \Theta, c_t) = t_{v_n - d + 1}\left(\mu_n, \frac{\Lambda_n (k_n + 1)}{k_n (v_n - d + 1)}\right) \quad (10)$$

where $$\mu_n = \frac{k_0 \mu_0 + n\bar{y}}{k_n},$$

$k_n = k_0 + n$, $v_n = v + n$ and $$\Lambda_n = \Lambda_0 + S + \frac{k_0 n}{k_n}(\bar{y} - \mu_0)^T,$$

with n being the length of segment at current time-step (i.e., $n = c_t$), S being the scatter matrix $S = \Sigma_{i=1}^{n}(y_i - \bar{y})(y_i - \bar{y})^T$ and $\bar{y}$ is the data mean. By maintaining a few statistics, the predictive posterior described in Equation (10) can easily be updated incrementally so that the change-point detection in this case is much faster than when using the Multivariate Polya distribution.

Place Label Inference

The label generation module 125 is configured to assign place labels to places detected in an input video probabilistically. Specifically, given the change-point posterior which contains the distribution over temporal segments, the label generation module 125 computes the place labels. In one embodiment, the conditional posterior on a place label associated with a segment is represented by the second term, $p(x_t^c \mid c_t, y_{1:t})$, of Equation (1) given the segment length. The conditional posterior $p(x_t^c \mid c_t, y_{1:t})$ over the input data from time 1 to time t provides predictions of place labels of the input video. The conditional posterior on the place label $p(x_t^c \mid c_t, y_{1:t})$ from Equation (1) can be expanded using Bayes law as:

$$p(x_t^c \mid c_t, y_{1:t}) \propto p(y_t^c \mid x_t^c, c_t) p(x_t^c \mid c_t) \quad (11)$$

where $y_t^c$ is the measurement data in the current segment, i.e. $y_t^c = \{y_{t-c_t}, \ldots, y_t\}$. Using L place models $M_1, M_2, \ldots M_L$, the probabilities of place labels generated by the L place models can be updated using Equation (11). The label generation module 125 uses the label probability for the segment computed in the previous time-step as the prior, i.e. $p(x_t^c \mid c_t) = x_{t-1}^c$. For a new segment with $c_t = 0$, the prior can be set to be a uniform distribution over the known place labels.

In one embodiment, the Gaussian Process classifiers are used as place models for computational efficiency. The input to the Gaussian Process classifiers is spatial pyramid histograms of an image training set described above. Because the dimensionality of the image histograms is very high, the image histograms are first projected down to a lower dimensional subspace using PCA. The dimensionality of the subspace is selected so that most of the variance in the image training set is captured. For example, for a two-level histogram using 400 clusters (dimensionality 2000), a 50 dimensional subspace suffices for learning the Gaussian Process classifiers.

A Gaussian Process (GP) is a distribution over the space of functions such that the joint distribution over any collection of data points is a Gaussian. For performing classification, it is assumed that N inputs $y=\{y_{1:N}\}$ and corresponding training outputs $t=\{t_{1:N}\}$ are available. The covariance function of the GP is then given by the N×N Gram matrix $K(y, y)=K$. Typically, the kernel function has a number of parameters $\theta$, which are also called the hyper-parameters of the GP that are learned using the image training set. In one embodiment, the following kernel function is used:

$$K(y, y') = v_0 \exp\left\{-\frac{1}{2}\sum_{i=1}^{d} w_i(y_i - y'_i)^2\right\} + v_1 \quad (12)$$

where d is the dimensionality of the training inputs and $\theta=\{\log v_o, \log v_1, \log w_1, \ldots, \log w_d\}$ are the parameters to be learned from the training data.

One embodiment of performing multi-class classification is performed by passing the continuous regression output of the Gaussian Process through a soft-max transfer function so that it can be interpreted as the probability of the input belonging to one of the multiple classes. The continuous output of the Gaussian Process is called the activation at the input value. In one embodiment, one GP is used per class label, denoting the input as $y_i$ and activation as $x_i^c$ for class c. The probability of belonging to the cth class, denoted by $\pi c_i^c$, is thus given by Equation (13) below:

$$\pi_i^c = \frac{\exp x_i^c}{\sum_{c'} \exp x_i^{c'}} \quad (13)$$

The Bayesian prediction distribution for an activation value $x^*$, whose corresponding input is $y^*$, is given by $$p(x^* \mid t) = \int p(x^*, x \mid t)dx \quad (14)$$

$$= \frac{1}{p(t)} \int p(x^*, x)p(t \mid x)dx,$$

where x are the activations corresponding to the training data. For a GP, the joint distribution on training data and query point activations is a Gaussian distribution with covariance function given by the Gram matrix on the set $\{y, y^*\}$. In one embodiment, only GPs having mean zero is considered for computational efficiency. The error model $p(t|x)$ is a multinomial distribution defined as $$p(y \mid \theta) = \frac{n!}{n_1! n_2! \ldots n_W!} \theta_1^{n_1} \theta_2^{n_2} \ldots \theta_W^{n_W},$$

where $\theta=[\theta_1, \theta_2, \ldots, \theta_W]$ is the multinomial parameter and W is the codebook size.

Practically, the integration described in Equation (14) is often approximated. In one embodiment, the integration is approximated using Laplace approximation which centers a Gaussian Process around the maximum of the distribution with the inverse covariance given by the second derivative matrix of the integrand $p(x^*, x|t)$. Since the likelihood is a multinomial distribution, the log-likelihood of the training data is $L=\Sigma_{i,c} t_i^c \ln \pi_i^c$, where $t_i^c$ is the probability of the ith training instance taking on class c. Using Equation (13), the log-likelihood is described by the following:

$$L = \sum_{i,c} t_i^c \left(x_i^c - \ln \sum_{c'} \exp \pi_i^{c'}\right). \quad (15)$$

The GP parameters $\theta$ are also obtained using a maximum aposteriori method where the posterior to maximize is $p(\theta|t) \propto p(t|\theta)p(\theta) = \int p(t|x)p(x|\theta)p(\theta)dx$. The first term of the integrand is the likelihood described in Equation (15), and $p(x|\theta)$ is the GP prior involving a zero mean Gaussian with the Gram matrix as the covariance. Laplace's approximation is performed on the integrand and the Laplace approximation can be further optimized.

The parameters $\theta$ are learned during the offline training and the predictive distribution described in Equation (14) is evaluated for each input at runtime. Since place categorization is not required after every step a robot takes, the place labeling system described here can be applied to runtime place labeling with acceptable system performance. For each segment provided by the Gaussian change-point detection, a place label is determined by jointly classifying all the measurements in the segment using Equations (13) and (14). This provides more robustness than classifying single measurements because the label probabilities are obtained by votes from all the measurements from the segment so that a few individual misclassifications can be tolerated without affecting the segment label.

Unknown Place Category Detection

For detection of an unknown place, the label generation module 125 needs to indicate the place being evaluated is not classified by any of the known place classifiers (e.g., Gaussian Process classifiers). In one embodiment, the label generation module 125 detects unknown place based on the uncertainty provided in the GP output. Specifically, it is noted that the activation of a GP for an input is just the distance to the margin of its corresponding GP classifier, where the margin is the classification boundary in kernel methods. Inputs that are close to the margin are harder to classify for the GP while inputs far away from the GP on either side of the margin can be confidently classified. Thus, measurements from unknown place categories will generally lie close to the margin. Further, the covariance of the activation value is also available from the GP through the Laplace approximation, which gives the inverse covariance as the negative second derivative matrix of the integrand in Equation (14).

The label generation module 125 detects unknown place using both the activation value and the covariance provided by the Gaussian Process classifier. In particular, the label generation module 125 uses perplexity statistic as the following:

$$p^* = \frac{x^*}{\sqrt{\Sigma^*}} \quad (16)$$

where x* is the activation value as in Equation (14) and Σ* is the associated covariance value. It is observed that p* has small values for difficult inputs. It is observed that p* has small values for difficult inputs.

The label generation module 125 computes the perplexity statistics for misclassified training examples and also calculates their mean and variance. Because p* has small values for difficult training examples, finding the average over the whole training set would bias the value upwards. A threshold value of the perplexity statistics can be set for runtime unknown places detection. In one embodiment, the threshold value is set as $$t^* = p_{av}^* - 2\sigma_{av}^{*"} \quad (17)$$

where $p^*_{av}$ is the average perplexity of the misclassified training examples and $\sigma_{av}^*$ is their standard deviation.

During runtime, any test instance having perplexity value less than t* is classified as an unknown place category. For example, a segment is labeled as unknown if a majority of the test instances in the segment have an unknown place category. In such a case, the probability of the unknown place category is set apriori to a distribution for unknown places p(x|new label). p(x|new label) is set such that the probability of the new label is twice the probability of the other known classes. The new place label can be either stored for future reference by training the Gaussian Process for the new class using the instances classified as unknown in the current segment, or it can be discarded if new places are of no interest.

Figure 6:
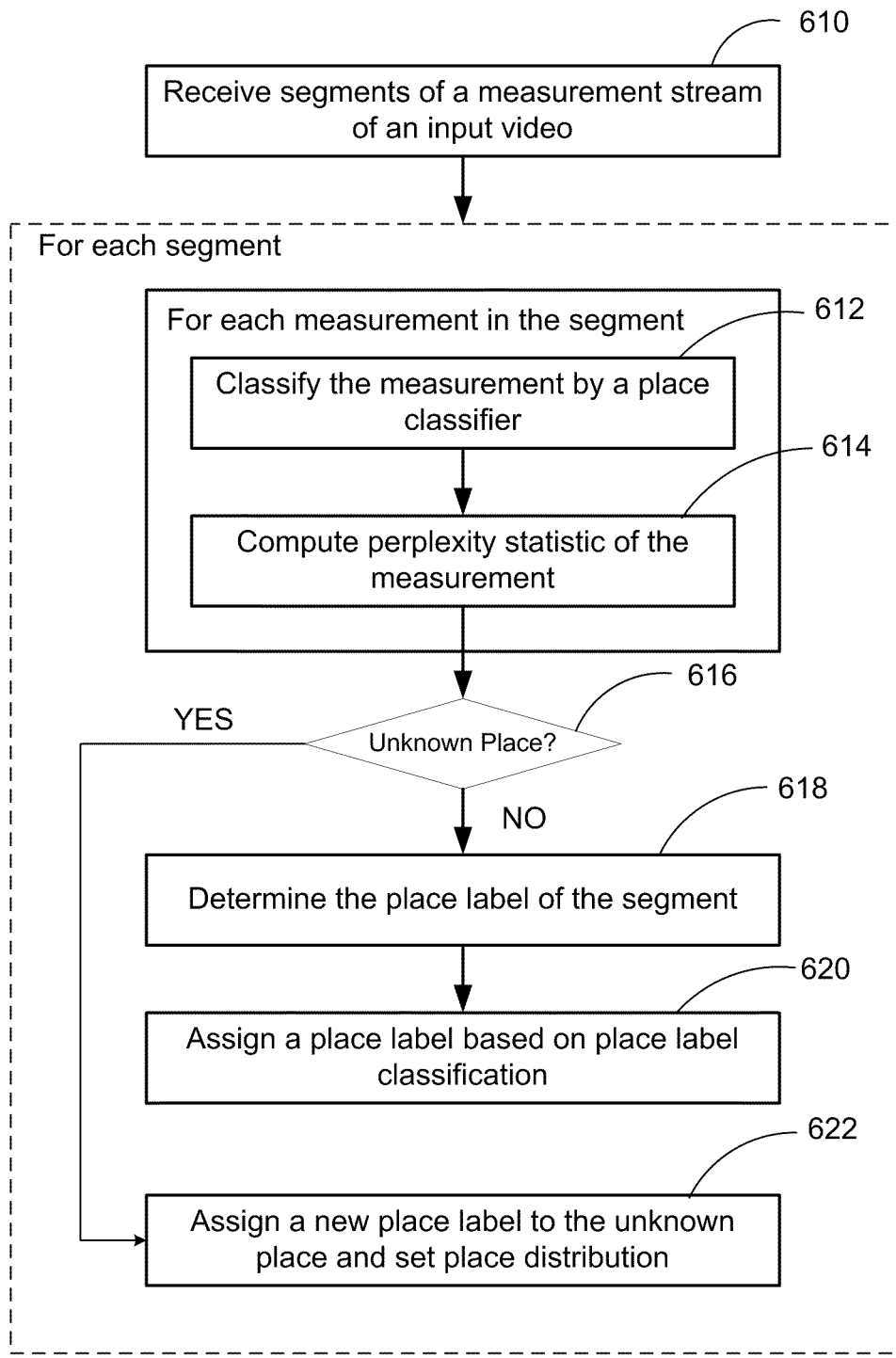
FIG. 6 is a flowchart of generating place labels using change-point detection based on multivariate Gaussian distribution.

FIG. 6 is a flowchart of generating place labels by the label generation module 125 at runtime using change-point detection based on multivariate Gaussian distribution. Initially, the label generation module 125 interacts with the segmentation module 115 to receive 610 the segments of a measurement stream of an input video. For each segment, the label generation module 125 generates a place label associated with the segment by computing the probability of the segment belonging to a type of place classified by a place classifier (e.g., the Gaussian Process classier).

In one embodiment, the label generation module 125 finds the place label for a segment by jointly classifying all the measurements (e.g., pyramids of image histograms) in the segment using Equations (13) and (14). Specifically, for each measurement in the segment, the label generation module 125 classifies 612 the measurement by computing the probability of the measurement being classified by a learned Gaussian Process classifier and computes 614 the perplexity statistic of the measurement (e.g., using Equation (16)) and a threshold value (e.g., t* described in Equation (17)).

Based on the probabilities and perplexity statistics generated with respect to all the measurements in the segment, the label generation module 125 determines 616 whether the segment corresponds to an unknown place. Responsive to the place label known to the Gaussian Process classifier, the label generation module 125 determines 618 the place label for the segment by the number of votes from the Gaussian Process classifier applied to the measurements of the segment. The label generation module 125 assigns 620 a place label to the segment based on the place label classification.

A segment is labeled as unknown if a majority of the test instances in the segment have an unknown place category. For example, a classification having perplexity value less than t* is classified as an unknown place category. Responsive to the place label unknown to the Gaussian Process classifier, the label generation module 125 assigns 622 a new place label to the segment corresponding to the unknown place and sets the place distribution to p(x|new label).

Experiments and Applications

FIG. 7A is a block diagram of an example experimental result of labeling places using change-point detection according to one embodiment of the invention. The top row 710a represents the thumbnails of images being tested. The middle row 720a shows ground truth of place labels for the images shown in top row 710a. There are five categories of places: living room, office, transition, meeting room 1 and meeting room 2. Place category "transition" means a place model for this place category is not learned during place model learning phase. At runtime, a frame of an input video not belonging to one of the above known place labels (e.g., living room, office, meeting room 1 meeting room 2) is labeled as a "transition" frame. The bottom row 730a shows the place labeling results. Comparing with the ground truth of place labels shown in row 720a, part of the meeting room 1 in the input video is misidentified as transition, but the overall accuracy of the place labeling is high.

Figure 7B:
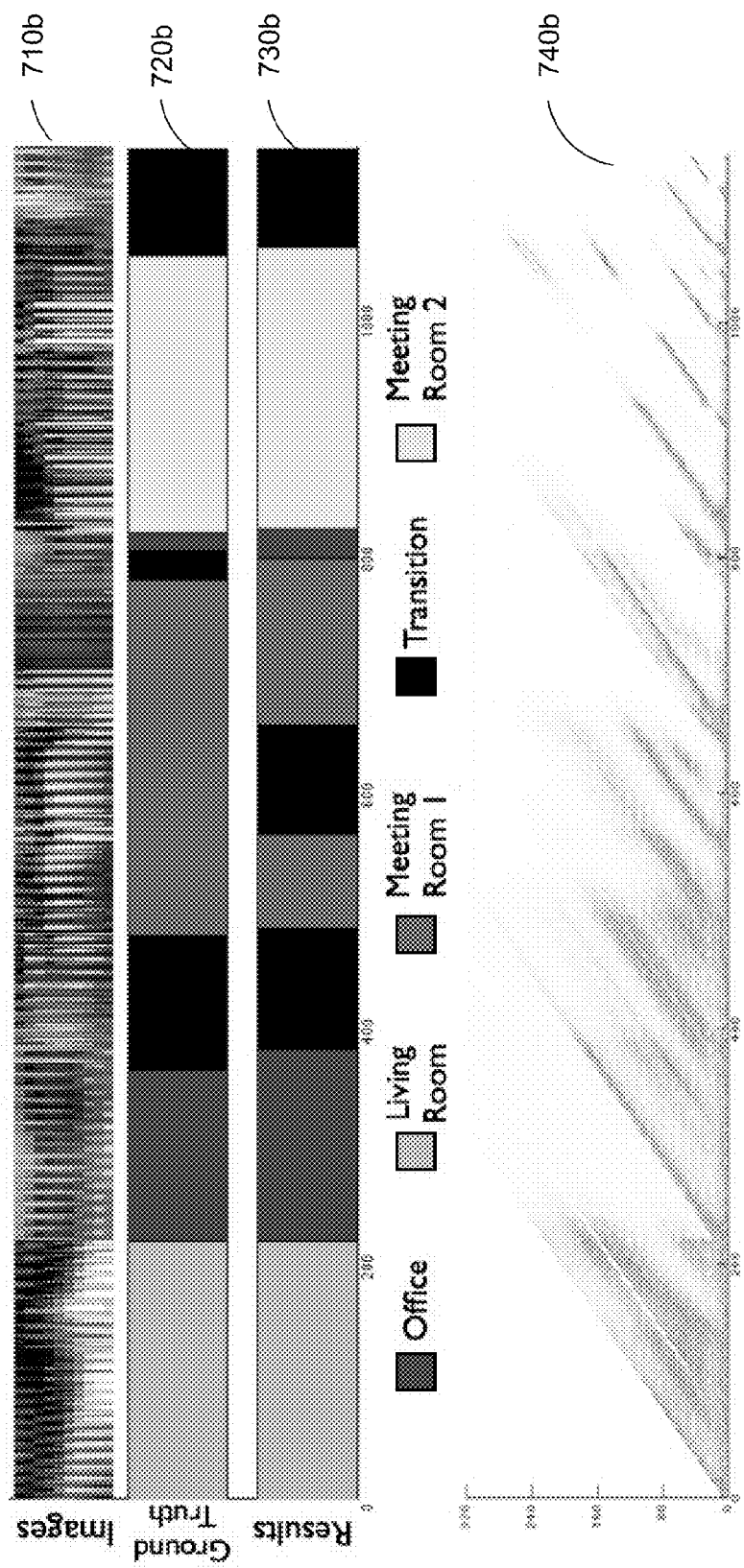
FIG. 7B is an example experimental result of labeling places using change-point detection according to one embodiment of the invention.

FIG. 7B is an example experimental result of labeling places using change-point detection according to one embodiment of the invention. FIG. 7B show an experimental result for a video sequence comprising 1043 frames with 5 pre-learned labels for kitchen, office, meeting room 1, meeting room 2 and transition. Top row 710b shows 10 pixels by 10 pixels thumbnails of the frames of the video sequence. The middle row 720b shows the ground truth of the place labels for places captured in the video sequence. The third row 730b shows the place labels generated by one embodiment of the place recognition system. The bottom row 740b shows the corresponding change-point posterior on segment lengths of segments of the video sequence.

While particular embodiments and applications of the invention have been illustrated and described herein, it is to be understood that the invention is not limited to the precise construction and components disclosed herein and that various modifications, changes, and variations may be made in the arrangement, operation, and details of the methods and apparatuses of the invention without departing from the spirit and scope of the invention as it is defined in the appended claims.

What is claimed is:

1. A computer implemented method for labeling places captured in a video stream, the method comprising:

receiving a video stream comprising multiple digital representations of images;

generating a measurement stream representing the video stream, wherein the measurement stream comprises one or more image histograms of the video stream;

segmenting the measurement stream into a plurality of segments corresponding to types of places in the video stream based on the histograms of the videos stream, wherein the boundary between two adjacent segments represents a change-point of the measurement stream at a time-step;

computing probability distributions of the segments over a plurality of place classifiers, wherein probability of a segment represents a likelihood that the segment is classified by a place classifier of the plurality of the place classifiers, computing probability distributions of the segments comprising:

projecting the measurement stream having a first dimensional space into a second dimensional space, wherein the second dimensional space has a smaller dimension than the one of the first dimensional space; and computing predictive probability distributions of the segments in the second dimensional space; and generating place labels for the types of places in video stream based on probabilities of change-points of the measurement stream, wherein the change-points are detected based on the probability distributions of the segments over the plurality of the place classifiers.

2. The method of claim 1, wherein generating the measurement stream comprises:

extracting image features from the images of the video stream;

for each image of the video stream:

generating one or more image histograms based on the extracted image features associated with the image, wherein each bin of an image histogram indicates the frequency of quantized image features in the image; and generating a spatial pyramid of image histograms associated with the image, wherein the spatial pyramid of image histograms associated with the image is a measurement of the image in the measurement stream.

3. The method of claim 2, wherein generating one or more image histograms of the image of the videos stream comprises:

dividing the image into a plurality of sub-images, each sub-image has a smaller spatial resolution than the spatial resolution of the image;

for each sub-image, generating one or more image histograms based on image features associated with the sub-image.

4. The method of claim 1, wherein segmenting the measurement stream comprises:

dividing the segment stream into a plurality of non-overlapping and adjacent segments;

modeling the change-points of the measurement stream by the plurality of the place classifiers.

5. The method of claim 1, further comprising learning the plurality of place classifiers from a plurality of image representations of images of an image training set.

6. The method of claim 5, wherein learning the plurality of place classifiers comprises:

extracting image features of the images of the image training set, wherein types of places in each image of the image training set are pre-labeled;

clustering the extracted images features to create a codebook of a plurality of code words, wherein a code word is represented by a cluster identification of quantized image features associated with the code word;

generating one or more image histograms for each image of the image training set, wherein each bin of an image histogram indicates the frequency of the quantized image features in the image.

7. The method of claim 1, wherein generating place labels for the types of places in video stream comprises:

for each segment of the measurement stream, the segment comprising one or more measurements:

generating a place label for each measurement of the segment, wherein the place label has a probability indicting that the segment is classified by a place classifier of the plurality of the place classifiers;

comparing the probabilities for the one or more measurements classified by the place classifier;

selecting the place label based on the probabilities of the measurements of the segment, the selected place label positively indicated by a majority of the probabilities of the measurements of the segment.

8. The method of claim 1, wherein the plurality of place classifiers are Gaussian Process classifiers, a Gaussian Process classifier configured to positively classify a place in a video sequence to its corresponding type of place.

9. The method of claim 1, wherein generating place labels for the types of places in video stream further comprises:

responsive to a segment not recognized by the plurality of place classifiers:

determining the segment corresponding to a place unknown to the plurality of the place classifiers; and assigning a new place label to the segment.

10. The method of claim 9, wherein determining the segment corresponding to a place unknown to the plurality of the place classifiers further comprises:

computing perplexity statistic of the classification of the segment using continuous output of the classification from the plurality of place classifiers and covariance value associated with the continuous output of the classification; and determining whether the segment corresponds to a place unknown to the plurality of place classifiers based on the perplexity statistic of the classification.

11. The method of claim 10, wherein determining whether the segment corresponds to a place unknown to the plurality of place classifiers further comprises:

comparing the perplexity statistic of the classification with a predefined threshold value; and determining the segment corresponds to a place unknown to the plurality of place classifiers responsive to the perplexity statistic of the classification below the threshold value.

12. A computer system for labeling places captured in a video stream, the system comprising:

a segmentation module configured to:

receive a video stream comprising multiple digital representations of images;

generate a measurement stream representing the video stream, wherein the measurement stream comprises one or more image histograms of the video stream;

segment the measurement stream into a plurality of segments corresponding to types of places in the video stream based on the histograms of the videos stream, wherein the boundary between two adjacent segments represents a change-point of the measurement stream at a time-step;

compute probability distributions of the segments over a plurality of place classifiers, wherein probability of a segment represents a likelihood that the segment is classified by a place classifier of the plurality of the place classifiers, wherein computing probability distributions of the segments comprises:

projecting the measurement stream having a first dimensional space into a second dimensional space, wherein the second dimensional space has a smaller dimension than the one of the first dimensional space; and computing predictive probability distributions of the segments in the second dimensional space; and a place label generation module configured to:

generate place labels for the types of places in video stream based on probabilities of change-points of the measurement stream, wherein the change-points are detected based on the probability distributions of the segments over the plurality of the place classifiers.

13. The system of claim 12, wherein the segmentation module is further configured to:
extract image features from the images of the video stream; for each image of the video stream:
generate one or more image histograms based on the extracted image features associated with the image, wherein each bin of an image histogram indicates the frequency of quantized image features in the image; and
generate a spatial pyramid of image histograms associated with the image, wherein the spatial pyramid of image histograms associated with the image is a measurement of the image in the measurement stream.

14. The system of claim 13, wherein the segmentation module is further configured to:
divide the image into a plurality of sub-images, each sub-image has a smaller spatial resolution than the spatial resolution of the image;
for each sub-image, generate one or more image histograms based on image features associated with the sub-image.

15. The system of claim 12, wherein the segmentation module is further configured to:
divide the segment stream into a plurality of non-overlapping and adjacent segments;
model the change-points of the measurement stream by the plurality of the place classifiers.

16. The system of claim 12, further comprising a label learning module configured to learn the plurality of place classifiers from a plurality of image representations of images of an image training set.

17. The system of claim 16, further comprising:
a feature detection module configured to extract image features of the images of the image training set, wherein types of places in each image of the image training set are pre-labeled;
a feature clustering module configured to cluster the extracted images features to create a codebook of a plurality of code words, wherein a code word is represented by a cluster identification of quantized image features associated with the code word;
an image representation module configured to generate one or more image histograms for each image of the image training set, wherein each bin of an image histogram indicates the frequency of the quantized image features in the image.

18. The system of claim 12, wherein the place label generating module is further configured to:
for each segment of the measurement stream, the segment comprising one or more measurements:
generate a place label for each measurement of the segment, wherein the place label has a probability indicting that the segment is classified by a place classifier of the plurality of the place classifiers;
compare the probabilities for the one or more measurements classified by the place classifier;
select the place label based on the probabilities of the measurements of the segment, the selected place label positively indicated by a majority of the probabilities of the measurements of the segment.

19. The system of claim 12, wherein the plurality of place classifiers are Gaussian Process classifiers, a Gaussian Process classifier configured to positively classify a place in a video sequence to its corresponding type of place.

20. The system of claim 12, wherein the place label generation module is further configured to:
responsive to a segment not recognized by the plurality of place classifiers:
determine the segment corresponding to a place unknown to the plurality of the place classifiers; and
assign a new place label to the segment.

21. The system of claim 20, wherein the place label generation module is further configured to:
compute perplexity statistic of the classification of the segment using continuous output of the classification from the plurality of place classifiers and covariance value associated with the continuous output of the classification; and
determine whether the segment corresponds to a place unknown to the plurality of place classifiers based on the perplexity statistic of the classification.

22. The system of claim 21, wherein the place label generation module is further configured to:
compare the perplexity statistic of the classification with a predefined threshold value; and
determine the segment corresponds to a place unknown to the plurality of place classifiers responsive to the perplexity statistic of the classification below the threshold value.

23. A computer program product for labeling places captured in a video stream, the computer program product comprising a non-transitory computer-readable medium containing computer program code for performing the operations:
receiving a video stream comprising multiple digital representations of images;
generating a measurement stream representing the video stream, wherein the measurement stream comprises one or more image histograms of the video stream;
segmenting the measurement stream into a plurality of segments corresponding to types of places in the video stream based on the histograms of the videos stream, wherein the boundary between two adjacent segments represents a change-point of the measurement stream at a time-step;
computing probability distributions of the segments over a plurality of place classifiers, wherein probability of a segment represents a likelihood that the segment is classified by a place classifier of the plurality of the place classifiers, wherein computing probability distributions of the segments comprises:
projecting the measurement stream having a first dimensional space into a second dimensional space, wherein the second dimensional space has a smaller dimension than the one of the first dimensional space; and
computing predictive probability distributions of the segments in the second dimensional space; and
generating place labels for the types of places in video stream based on probabilities of change-points of the measurement stream, wherein the change-points are detected based on the probability distributions of the segments over the plurality of the place classifiers.

24. The computer program product of claim 23, wherein the computer program code for generating the measurement stream comprises computer program code for:
extracting image features from the images of the video stream;
for each image of the video stream:
generating one or more image histograms based on the extracted image features associated with the image, wherein each bin of an image histogram indicates the frequency of quantized image features in the image; and generating a spatial pyramid of image histograms associated with the image, wherein the spatial pyramid of image histograms associated with the image is a measurement of the image in the measurement stream.

25. The computer program product of claim 24, wherein the computer program code for generating one or more image histograms of the image of the videos stream comprises computer program code for:
dividing the image into a plurality of sub-images, each sub-image has a smaller spatial resolution than the spatial resolution of the image;
for each sub-image, generating one or more image histograms based on image features associated with the sub-image.

26. The computer program product of claim 23, wherein the computer program code for segmenting the measurement stream comprises computer program code for:
dividing the segment stream into a plurality of non-overlapping and adjacent segments;
modeling the change-points of the measurement stream by the plurality of the place classifiers.

27. The computer program product of claim 23, further comprising computer program code for learning the plurality of place classifiers from a plurality of image representations of images of an image training set.

28. The computer program product of claim 27, wherein the computer program code for learning the plurality of place classifiers comprises computer program code for:
extracting image features of the images of the image training set, wherein types of places in each image of the image training set are pre-labeled;
clustering the extracted images features to create a codebook of a plurality of code words, wherein a code word is represented by a cluster identification of quantized image features associated with the code word;
generating one or more image histograms for each image of the image training set, wherein each bin of an image histogram indicates the frequency of the quantized image features in the image.

29. The computer program product of claim 23, wherein computer program code for generating place labels for the types of places in video stream comprises computer program code for:
for each segment of the measurement stream, the segment comprising one or more measurements:
generating a place label for each measurement of the segment, wherein the place label has a probability indicting that the segment is classified by a place classifier of the plurality of the place classifiers;
comparing the probabilities for the one or more measurements classified by the place classifier;
selecting the place label based on the probabilities of the measurements of the segment, the selected place label positively indicated by a majority of the probabilities of the measurements of the segment.

30. The computer program product of claim 23, wherein the plurality of place classifiers are Gaussian Process classifiers, a Gaussian Process classifier configured to positively classify a place in a video sequence to its corresponding type of place.

31. The computer program product of claim 23, wherein computer program code for generating place labels for the types of places in video stream further comprises computer program code for:
responsive to a segment not recognized by the plurality of place classifiers:
determining the segment corresponding to a place unknown to the plurality of the place classifiers; and
assigning a new place label to the segment.

32. The computer program product of claim 31, wherein computer program code for determining the segment corresponding to a place unknown of the place classifiers further comprises computer program code for:
computing perplexity statistic of the classification of the segment using continuous output of the classification from the plurality of place classifiers and covariance value associated with the continuous output of the classification; and
determining whether the segment corresponds to a place unknown to the plurality of place classifiers based on the perplexity statistic of the classification.

* * * * *

UNITED STATES PATENT AND TRADEMARK OFFICE
CERTIFICATE OF CORRECTION

PATENT NO. : 8,559,717 B2 Page 1 of 1
APPLICATION NO. : 13/048617
DATED : October 15, 2013
INVENTOR(S) : Ananth Ranganathan It is certified that error appears in the above-identified patent and that said Letters Patent is hereby corrected as shown below:

In the Claims:

Column 17, Claim 7, line 62; delete "indicting" and insert --indicating--.

Column 19, Claim 18, lines 53 through 54; delete "indicting" and insert --indicating--.

Column 22, Claim 29, line 5; delete "indicting" and insert --indicating--.

Signed and Sealed this
Fifteenth Day of July, 2014

Michelle K. Lee
*Deputy Director of the United States Patent and Trademark Office*